Mar. 3, 1925.

P. MUELLER ET AL 1,528,339

INTEGRAL STOP

Filed May 25, 1923

Inventor
Philip Mueller
Anton C. Schuermann

By Cushman, Bryant & Darby
Attorneys

Patented Mar. 3, 1925.

1,528,339

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

INTEGRAL STOP.

Application filed May 25, 1923. Serial No. 641,426.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Integral Stops, of which the following is a specification.

This invention, which is a division of applicants' co-pending application, Serial No. 335,683, filed Nov. 4, 1919, and is made the subject of a separate application under official requirement, relates to stops for faucets and other fittings, and more particularly to installations, wherein the Fuller type of stop is employed.

Primarily, the invention consists in providing means in which the removable parts of the stop may, for the purpose of renewal or repair be easily withdrawn from the fitting, without the necessity of disassembling the several parts.

The installation, in addition to being very simple to construct, comprises a relatively small number of parts and may be very economically manufactured.

A further advantage of the invention resides in providing the inlet or supply pipe leading to a cock or faucet, with an integral stop for regulating the flow of water, and is particularly designed to take the place of the unsightly handle cocks now in common use, which are especially objectionable in that they detract from the general appearance of the fitting, and are often located in some inaccessible place.

By reason of the present construction, the stop is conveniently positioned, and the appearance of the fitting, instead of being impaired, is greatly enhanced.

In the drawing, wherein is disclosed a preferred embodiment of our invention:—

Figure 1:
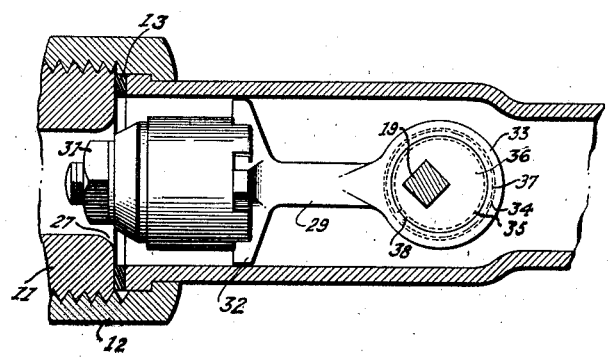
Fig. 1 is a horizontal sectional view through the fitting.
Figure 2:
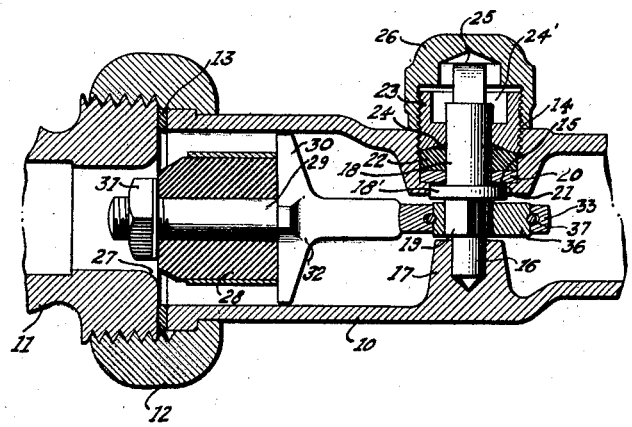
Fig. 2 is a vertical sectional view through Fig. 1.

Referring to the drawings, wherein like numerals indicate like parts in the several views, 10 denotes a fitting which is connected at one end to the shank 11 of any suitable faucet or cock (not shown) by means of the coupling nut 12 and the packing 13.

The fitting 10 is provided with a countersunk packing chamber 14 having a reduced central opening 15, which alines with a recess or bearing 16 formed in the boss 17. An operating rod 18, having a squared surface 19, extends through the chamber 14 and has its lower end journalled in the bearing 16. A metal washer 20, preferably, rests against the shoulder 21 formed in the bottom of the chamber 14, and against the upper side of the washer 20 the packing 22 is forced by means of the packing nut 23, which is externally threaded so as to engage the corresponding internal threads formed in the chamber 14.

The lower end of the packing nut 23 is, preferably, curved or cone-shaped, as at 24, so as to force the packing 22 tight against the rod 18, and thus prevent leakage of water through the chamber 14. The upper end of the nut 23 has a polygonal recess 24' forming suitable wrench grips so as to permit turning movement to be imparted to the packing nut. The operating rod 18 is preferably formed with an upper squared end 25, to which a wrench or other suitable tool may be applied for actuating the Fuller ball into and out of engagement with its seat 27. A closure cap 26 secured to the threaded portion of the nut 23 protects the packing and makes an attractive sanitary fitting.

The operating rod 18 adjacent the shoulder 21 has an integral collar 18' which fits closely within the reduced opening formed in the bottom of the chamber.

The inlet opening 27 of the shank faucet 11 is, preferably, closed or regulated by a Fuller ball 28, mounted on the stem 29 between the abutment or stem guide 30 and the nut 31. The guide 30 is, preferably, constructed with a plurality of radial arms 32 which engage the inner surface of the fitting 10 so as to keep the Fuller ball in a central position, and allow the water or other fluid to pass freely into the faucet.

Figure 3:
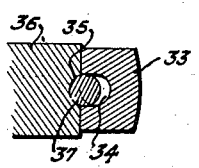
Fig. 3 is a detail enlarged sectional view showing the connection between the valve stem and the eccentric disk.

The inner end of the stem 29 terminates in a strap 33 having an annular semi-circular groove 34 adapted to register with a corresponding groove 35 formed in the periphery of the disk 36, which is eccentrically mounted on the operating rod 18 by means of a squared opening which is adapted to engage the portion 19 on the rod 18; the groove 34 in the strap being of greater depth than the groove 35 on the disk, as shown in Fig. 3, so as to permit a spring ring 37 to be moved into and out of engagement with the groove 35. The spring 37 is preferably cut, as at 38, so as to make it readily adjustable to its working position.

It will be seen, by reason of the present construction, that when the disk 36 is pushed into place the ring 37 will spring back into the larger groove 34 of the strap so as to allow the disk 36 to be pressed into its proper position. The groove 35 being in alignment with the ring 37 permits the ring to seat itself therein, and normally tends to interlock or clamp the strap and disk together. When the ring 37 is seated in the groove 35 it requires considerable effort to displace the disk out of position, so that the disk is held securely in place within the strap, but may be removed therefrom when desired.

It will be seen that the strap 33, being detachably connected to the disk 36 by means of the spring 37, will permit the fitting to be quickly disassembled upon removal of the closure cap 26, together with the packing nut 23 and its associated parts.

It is to be understood that the form of the invention herewith disclosed is merely illustrative and in no sense restrictive, and that mechanical modifications as come within the purview of one skilled in the art may be made without departing from the spirit of the invention and the scope of the appended claims.

We claim:

1. A fitting of the class described having a packing chamber, an opening in said chamber, a bearing diametrically opposite said opening, an operating rod extending through said chamber and having one end engaging in said bearing, an eccentric disk on said rod, a valve stem in said fitting, and interlocking means connecting said stem to the periphery of said disk.

2. A fitting of the class described having a countersunk packing chamber, an opening in said chamber, a bearing diametrically opposite said opening, an operating rod extending through said chamber and having one end engaging in said bearing, an eccentric disk on said rod, a valve stem in said fitting, and interlocking means detachably connecting said stem to the periphery of said disk.

3. A fitting of the class described having a countersunk chamber, an opening in said chamber, a bearing diametrically opposite said opening, an operating rod extending through said chamber and haing one end engaging in said bearing, a disk eccentrically mounted on said rod, a valve stem in said fitting provided with a strap portion surrounding said rod, and resilient interlocking means operatively connecting said strap to the periphery of said disk.

4. A fitting of the class described having a countersunk chamber, an opening in said chamber, a bearing diametrically opposite said opening, an operating rod extending through said chamber and having one end engaging in said bearing, a disk eccentrically mounted on said rod, a valve stem in said fitting provided with a strap portion surrounding said rod, and resilient interlocking means detachably connecting said strap to the periphery of said disk.

5. A fitting of the class described having a countersunk chamber, an opening in said chamber, a bearing diametrically opposite said opening, an operating rod extending through said chamber and having one end engaging in said bearing, a disk eccentrically mounted on said rod, a valve stem in said fitting having a strap portion surrounding said rod and provided with an internal annular groove, a corresponding groove formed in the periphery of said disk, and a spring adapted to fit in said grooves for locking the strap to the disk.

6. A fitting of the class described having a countersunk chamber, an opening in said chamber, a bearing diametrically opposite said opening, an operating rod extending through said chamber and having one end engaging in said bearing, a disk eccentrically mounted on said rod, a valve stem in said fitting having a strap portion surrounding said rod and provided with an internal annular groove, a corresponding groove formed in the periphery of said disk but of greater depth, and a spring adapted to fit in said grooves for locking the strap to the disk.

7. In a fitting of the class described having a countersunk threaded chamber, an opening in said chamber, a bearing diametrically opposite said opening, an operating rod extending through said chamber and having one end engaging in said bearing, a collar about said rod engaging in the opening in said chamber, a packing in said chamber, a threaded nut engaging said chamber and adapted to maintain the packing in position, a recess in the upper end of said nut, a disk eccentrically mounted on said rod, a valve stem in said fitting having a strap portion surrounding said disk, resilient means for locking said strap to the periphery of said disk, and means at one end of said rod for actuating said valve stem.

8. In a fitting of the class described having a countersunk threaded chamber, an opening in said chamber, a bearing diametrically opposite said opening, an operating rod extending through said chamber and having one end engaging in said bearing, a collar about said rod engaging in the opening in said chamber, a packing in said chamber, a threaded nut engaging said chamber and adapted to maintain the packing in position, a recess in the upper end of said nut, a disk eccentrically mounted on said rod, a valve stem in said fitting having a strap portion surrounding said disk, resilient means for locking said strap to the periphery of said disk, means at one end of said rod for actuating said valve stem, and a closure cap threaded to said nut.

9. A fitting of the class described having a packing chamber, an opening in said chamber, a bearing diametrically opposite said opening, an operating rod extending through said chamber and journalled at one end in said bearing, a collar about said rod engaging the opening in said chamber, a square portion on said rod below said collar, an eccentric disk having a correspondingly squared orifice connected to said rod, a valve stem in said fitting having a strap portion encircling said disk, resilient means for locking said strap portion to the periphery of said disk, a packing in said chamber, a nut holding said packing in place, and means on the end of said rod for actuating said valve.

10. A fitting of the class described having a packing chamber, an opening in said chamber, a bearing diametrically opposite said opening, an operating rod extending through said chamber and journalled at one end in said bearing, a collar about said rod engaging the opening in said chamber, a square portion on said rod below said collar, an eccentric disk having a correspondingly squared orifice connected to said rod, a valve stem in said fitting having a strap portion encircling said disk, resilient means for locking said strap portion to the periphery of said disk, a packing in said chamber, a nut holding said packing in place, means on the end of said rod for actuating said valve, and a closure cap threaded to said nut.

11. In combination, a faucet shank having a valve seat, a fitting connected to the shank, a chamber in the side of the fitting, a rod extending through the chamber and into said fitting, a Fuller ball having a stem provided with a strap portion encircling said rod, a disk eccentrically mounted on said rod, and resilient means for locking said strap to the periphery of said disk.

12. In combination, a faucet shank having a valve seat, a fitting connected to the faucet, a packing chamber in the side of the fitting, a rod extending through the packing chamber and into said fitting, a Fuller ball having a stem provided with a strap portion encircling said rod, a disk eccentrically mounted on said rod, a packing about the rod in said chamber, a packing nut screwed into said chamber for forcing said packing into place, and resilient means for locking said strap to the periphery of said disk.

13. In combination, a faucet shank having a valve seat, a fitting connected to the faucet, a chamber in the side of the fitting, a rod extending through the packing chamber and into said fitting, a Fuller ball having a stem provided with a strap portion encircling said rod, said strap having an annular internal groove, a disk eccentrically mounted on said rod, said disk being provided with a peripheral groove corresponding to the groove in said strap, and a spring adapted to fit in said groove for locking the strap to the disk.

14. In combination, a faucet shank having a valve seat, a fitting connected to the faucet, a countersunk chamber in the side of the fitting, having an opening therein, a bearing diametrically opposite said opening, an operating rod extending through said chamber and journalled at one end in said bearing, a square surface formed on said rod, an eccentric disk having a correspondingly squared orifice engaging said surface, a Fuller ball having a stem provided with a strap portion surrounding said rod, said strap having a circumferential groove, said disk having a corresponding peripheral groove, and a spring adapted to fit in said grooves for locking the strap to the disk.

15. In combination, a faucet shank having a valve seat, a fitting connected to the faucet, a countersunk chamber in the side of the fitting having an opening therein, a bearing diametrically opposite said opening, an operating rod extending through said chamber and journalled at one end in said bearing, a collar about said rod engaging the opening in said chamber, a square surface formed on said rod, an eccentric disk having a correspondingly squared orifice engaging said surface, a Fuller ball having a stem provided with a strap portion surrounding said rod, said strap having a circumferential groove, said disk having a corresponding peripheral groove of less depth than the groove in said strap, a spring adapted to fit in said grooves for locking the strap to the disk, a packing about said rod in said chamber, a packing nut screwed into said chamber for forcing the packing into its seat, said rod having a tool engaging head, a recess in said nut for permitting a tool to engage said head, and a closure cap secured to said nut.

In testimony whereof we have hereunto set our hands.

PHILIP MUELLER.
ANTON C. SCHUERMANN.